US011692846B2

United States Patent
Ootsuji et al.

(10) Patent No.: US 11,692,846 B2
(45) Date of Patent: Jul. 4, 2023

(54) MAP PRESENTATION DEVICE

(71) Applicants: HITACHI AUTOMOTIVE SYSTEMS, LTD., Hitachinaka (JP); NISSAN MOTOR CO., LTD., Yokohama (JP)

(72) Inventors: Shinya Ootsuji, Hitachinaka (JP); Akihiko Sato, Tokyo (JP); Mitoshi Yajima, Tokyo (JP); Seiji Tokunaga, Yokohama (JP)

(73) Assignees: HITACHI ASTEMO, LTD., Hitachinaka (JP); NISSAN MOTOR CO., LTD., Yokohama (JP)

( * ) Notice: Subject to any disclaimer, the term of this patent is extended or adjusted under 35 U.S.C. 154(b) by 221 days.

(21) Appl. No.: 17/041,044

(22) PCT Filed: Mar. 11, 2019

(86) PCT No.: PCT/JP2019/009581
§ 371 (c)(1),
(2) Date: Sep. 24, 2020

(87) PCT Pub. No.: WO2019/188165
PCT Pub. Date: Oct. 3, 2019

(65) Prior Publication Data
US 2021/0140782 A1 May 13, 2021

(30) Foreign Application Priority Data
Mar. 28, 2018 (JP) .................. 2018-061643

(51) Int. Cl.
*G01C 21/36* (2006.01)
*G06V 20/56* (2022.01)

(52) U.S. Cl.
CPC ....... *G01C 21/367* (2013.01); *G01C 21/3605* (2013.01); *G06V 20/56* (2022.01)

(58) Field of Classification Search
CPC ............. G01C 21/367; G01C 21/3605; G01C 21/3881; G01C 21/3889; G01C 21/3446; G06V 20/56; G09B 29/106
See application file for complete search history.

(56) References Cited

U.S. PATENT DOCUMENTS

2004/0193370 A1* 9/2004 Umezu ................. G01C 21/32
701/450
2006/0047420 A1 3/2006 Tanaka
(Continued)

FOREIGN PATENT DOCUMENTS

CN 1668893 A 9/2005
CN 101030214 A 9/2007
(Continued)

OTHER PUBLICATIONS

Partial Supplementary European Search Report issued in corresponding European Patent Application No. 19777755.0 dated Nov. 5, 2021.
(Continued)

*Primary Examiner* — Abby Y Lin
*Assistant Examiner* — Dylan Brandon Mooney
(74) *Attorney, Agent, or Firm* — Foley & Lardner LLP

(57) ABSTRACT

Road information of surroundings of an own vehicle is kept as latest version as possible, and road information of distant areas are updated efficiently. A map providing device according to the present invention searches for an update target portion included in a planned travel route, and also searches for an update target portion with an end point of the planned travel route being a starting point.

11 Claims, 9 Drawing Sheets

(56) References Cited

U.S. PATENT DOCUMENTS

| | | |
|---|---|---|
| 2006/0173614 A1 | 8/2006 | Nomura |
| 2007/0282524 A1* | 12/2007 | Tanizaki ............... G09B 29/10 |
| | | 340/995.12 |
| 2008/0004791 A1 | 1/2008 | Sera |
| 2008/0082255 A1 | 4/2008 | Takahata et al. |
| 2008/0208451 A1 | 8/2008 | Minami |
| 2009/0019057 A1 | 1/2009 | Hayashi et al. |
| 2009/0048775 A1 | 2/2009 | Okude et al. |
| 2009/0171976 A1 | 7/2009 | Obara et al. |
| 2009/0187336 A1 | 7/2009 | Kawamata et al. |
| 2009/0248758 A1 | 10/2009 | Sawai et al. |
| 2010/0332132 A1 | 12/2010 | Okude et al. |
| 2011/0029228 A1 | 2/2011 | Nakamura et al. |
| 2011/0224900 A1 | 9/2011 | Hiruta et al. |
| 2011/0282575 A1 | 11/2011 | Masuda et al. |
| 2013/0013204 A1 | 1/2013 | Kazama et al. |
| 2013/0345977 A1 | 12/2013 | Shimizu |
| 2016/0313132 A1 | 10/2016 | Larroy |

FOREIGN PATENT DOCUMENTS

| | | | | |
|---|---|---|---|---|
| CN | 101097658 A | 1/2008 | | |
| CN | 101256079 A | 9/2008 | | |
| CN | 101363737 A | 2/2009 | | |
| CN | 101501452 A | 8/2009 | | |
| CN | 101936744 A | 1/2011 | | |
| CN | 101988834 A | 3/2011 | | |
| CN | 102192755 A | 9/2011 | | |
| CN | 102865872 A | 1/2013 | | |
| EP | 1 832 990 A1 | 9/2007 | | |
| JP | 2004-85245 A | 3/2004 | | |
| JP | 2004-251790 A | 9/2004 | | |
| JP | 2006-275778 A | 10/2006 | | |
| JP | 2008039488 A | * | 2/2008 | ............ G01C 21/32 |
| JP | 2009-157227 A | 7/2009 | | |
| JP | 2011-163951 A | 8/2011 | | |
| JP | 2013-170916 A | 9/2013 | | |
| JP | 2014-006437 A | 1/2014 | | |
| JP | 2014-20852 A | 2/2014 | | |
| JP | 2014-215205 A | 11/2014 | | |
| JP | 2014215205 A | * | 11/2014 | |
| JP | 2015-1471 A | 1/2015 | | |
| WO | WO-2004/008073 A1 | 1/2004 | | |

OTHER PUBLICATIONS

International Search Report with English translation and Written Opinion issued in corresponding application No. PCT/JP2019/009581 dated Jun. 18, 2019.
Extended European Search Report issued in EP 19777755.0 dated Apr. 4, 2022 (15 pages).
Chinese Office Action and Search Report on CN Appl. Ser. No. 201980022124.0 dated Jan. 26, 2022 (16 pages).
Cui, S. et al., "Autonomous Exploration Approach of Mobile Robot Based on Visual FastSLAM", Pattern Recognition and Artificial Intelligence, 2016, vol. No. 29, Issue No. 12, pp. 1083-1094.
Zhang, Y. et al., "Vehicle-mounted Mobile Mapping System Application in Large Scale Map Measurement and Update", Beijing Surveying and Mapping, 2016, Issue No. 6, 5 pages.
Zhang, Y. et al., "Updating Landsat-based forest cover maps with MODIS images using multiscale spectral-spatial-temporal super-resolution mapping", Int. J. Appl. Earth Obs. Geoinformation, 2017, vol. No. 63, pp. 129-142.

* cited by examiner

MAP PRESENTATION DEVICE

TECHNICAL FIELD

The present invention relates to a map providing device that provides map data describing a map of a road on which a vehicle travels.

BACKGROUND ART

In a navigation system or an autonomous driving system of a vehicle, map data describing information about road coordinates and the like is used. Since the map data is updated, it is desirable for the vehicle to retain the latest version of the map data as much as possible. Accordingly, a vehicle control device generally accesses a map distribution server by wireless communication, obtains an updated portion of the map data, and reflects it on the map data of the own vehicle.

The PTL 1 listed below describes a map update system. This document has an objective "to provide a map update system that can preferentially obtain road information necessary for a user" and discloses technology such that "a map update system for updating map data of a navigation device 30 by map data stored in a map server, comprising: a travel history DB 32 storing travel history data of a vehicle equipped with a navigation device; a first destination calculation unit that obtains, as a first destination, a point where a number of times or frequency of visiting is equal to or more than a predetermined number of times or frequency based on the travel history data; a first route searcher 40 that obtains, as a first route, a route of which a number of times or frequency of using is equal to or more than a predetermined number or frequency among routes used for visiting the first destination based on the travel history data; a second route searcher that obtains a second route used for visiting the first destination when a part of the first route is not usable; and a map update unit that updates map data in order of data of the first route and the second route, and other data" (see Abstract).

CITATION LIST

Patent Literature

PTL 1: JP 2014-006437 A

SUMMARY OF INVENTION

Technical Problem

Update data distributed by the map distribution server exists for every update target portion. A communication load and a calculation load of an update process may differ depending on the order in which the update data is obtained and applied to the own vehicle.

For example, if the order of update is not considered at all, there is a possibility that road information of the area where the own vehicle is going to head to will remain the old version. On the other hand, when only a surrounding area of the own vehicle is constantly updated, it is possible to use the latest version of the map while the vehicle is traveling only in the surrounding area, but when traveling to a distant area infrequently for example, a large amount of update data has been accumulated and is updated at once. Thus, it is possible that the communication load and the calculation load become excessive. The conventional art such as described in PTL 1 does not always sufficiently consider how to balance between the update of surroundings of the own vehicle and the update of distant areas.

The present invention has been made in view of the above problems, and an objective thereof is to keep road information of surroundings of an own vehicle as latest version as possible and efficiently update the road information of distant areas.

Solution to Problem

A map providing device according to the present invention searches for an update target portion included in a planned travel route, and also searches for an update target portion from an end point of the planned travel route as a starting point of the search.

Advantageous Effects of Invention

With a map providing device of the present invention, it is possible to preferentially search for an update target portion of surroundings of an own vehicle, and also to efficiently search for the update target portion in an area away from the surroundings of the own vehicle.

DESCRIPTION OF EMBODIMENTS

First Embodiment

Figure 1:
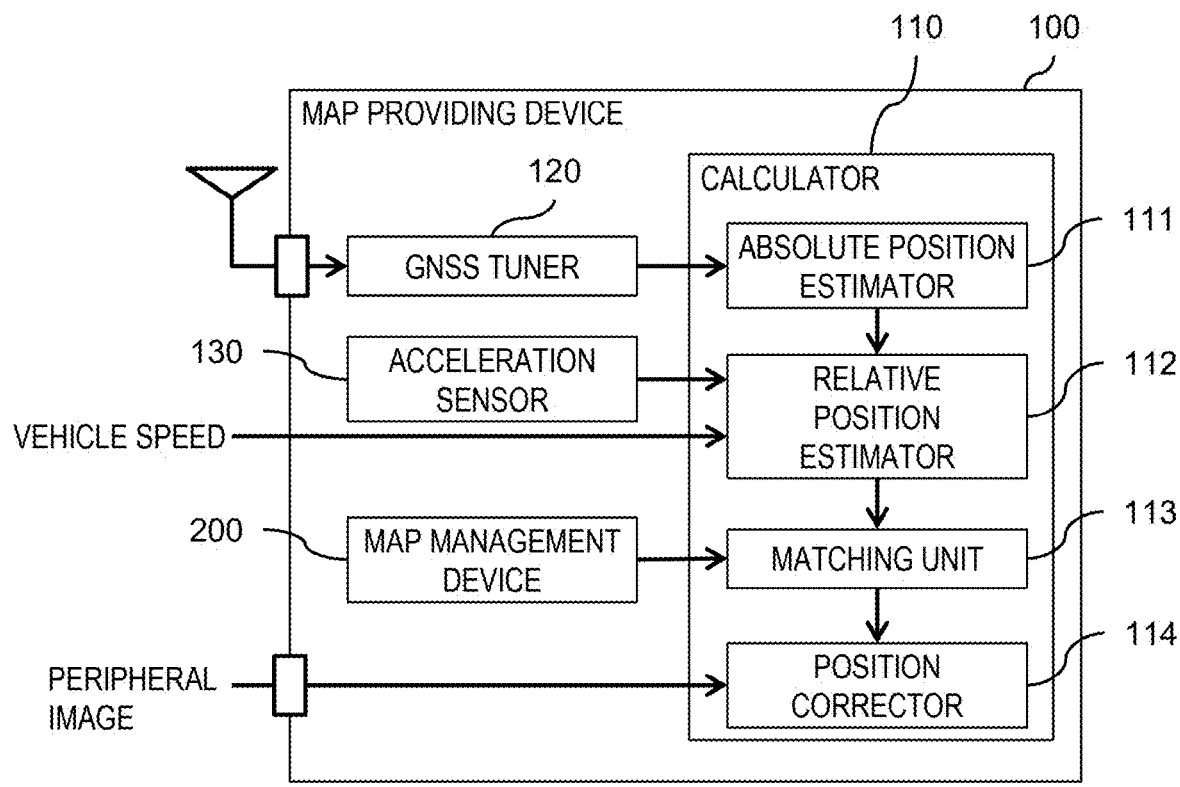
FIG. 1 is a configuration diagram of a map providing device 100 according to a first embodiment.

FIG. 1 is a configuration diagram of a map providing device 100 according to a first embodiment of the present invention. The map providing device 100 is a device that provides the position of an own vehicle and map information of surroundings of the own vehicle to a device controlling operation of the vehicle. The map providing device 100 is installed in the vehicle. The map providing device 100 includes a calculator 110, a GNSS tuner 120, an acceleration sensor 130, and a map management device 200. The calculator 110 has an absolute position estimator 111, a relative position estimator 112, a matching unit 113, and a position corrector 114.

The GNSS tuner 120 obtains vehicle position coordinates from the GNSS system. The position coordinates are obtained without using the state of the vehicle itself or surrounding information, and thus may be referred to as absolute positions. The acceleration sensor 130 measures acceleration of the vehicle. The map management device 200 provides detailed map data. For example, the coordinates of roads and lanes can be provided as map data.

The absolute position estimator 111 estimates the current absolute position of the vehicle 10 based on the absolute position coordinates obtained by the GNSS tuner 120. The relative position estimator 112 estimates a relative position of the vehicle 10 on the basis of the absolute position, using information such as the acceleration obtained by the acceleration sensor 130 and the vehicle speed of the vehicle 10. The relative position is used to obtain a vehicle position with higher accuracy than the absolute position obtained from the GNSS tuner 120. The relative position also has a role of complementing coordinates obtained intermittently via the GNSS. The matching unit 113 identifies the road or lane where the vehicle 10 is currently present by comparing the absolute position and the relative position of the vehicle 10 with the map data. The position corrector 114 obtains a surrounding image of the vehicle 10 from an imaging device such as a camera, and corrects the absolute position and relative position of the vehicle 10 with higher accuracy based on the surrounding image. The calculator 110 outputs the current position of the vehicle 10 calculated as described above and the map information based on the position.

Figure 2:
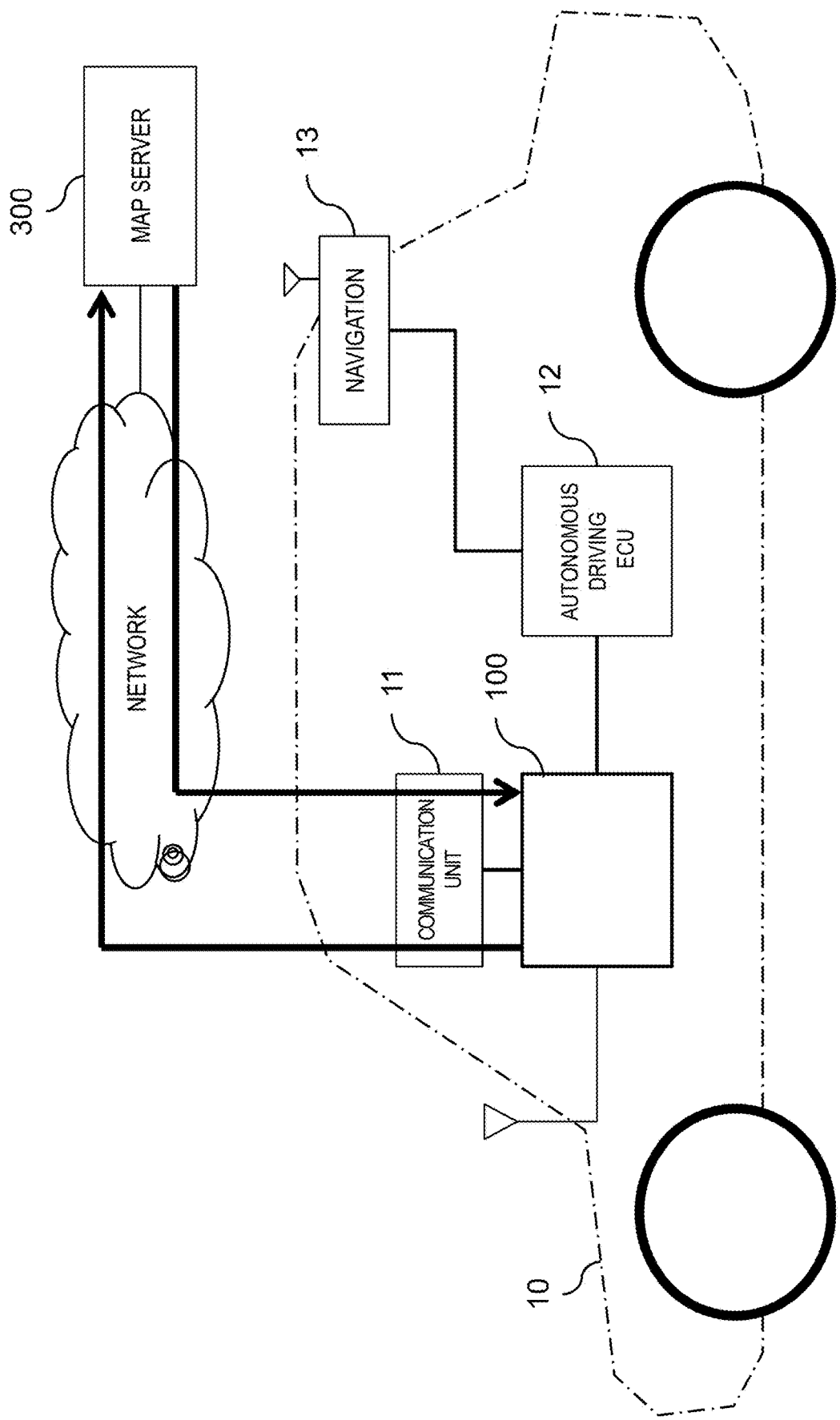
FIG. 2 is a schematic diagram of an onboard network mounted in a vehicle 10.

FIG. 2 is a schematic diagram of an onboard network mounted in the vehicle 10. The map providing device 100 accesses a map server 300 via a communication unit 11 and a network (for example, a wireless communication network and the Internet). The map management device 200 incorporated in the map providing device 100 inquires of the map server 300 whether or not there is a portion that has not been updated among the map data held by the vehicle 10. That is, the map providing device 100 inquires whether or not there is a portion that has been updated on the map server 300 but has not been updated yet on the map management device 200. If a corresponding portion exists, the map management device 200 downloads update data describing road information of the portion from the map server 300 and reflects the update data on the map data held by the vehicle 10.

However, if all non-updated portions are obtained from the map server 300 and reflected, the communication load and the calculation load may become excessive. Therefore, it is desirable to appropriately determine which of the non-updated portions is to be updated. As will be described later, this process can be said to be a process of searching for an update target portion in the area described by the map data 241.

The map providing device 100 can provide map data to an autonomous driving electronic control unit (ECU) 12, for example. The autonomous driving ECU 12, for example, obtains a planned travel route of the vehicle 10 from, for example, a car navigation system 13 and controls the vehicle 10 to travel along the planned travel route.

Figure 3:
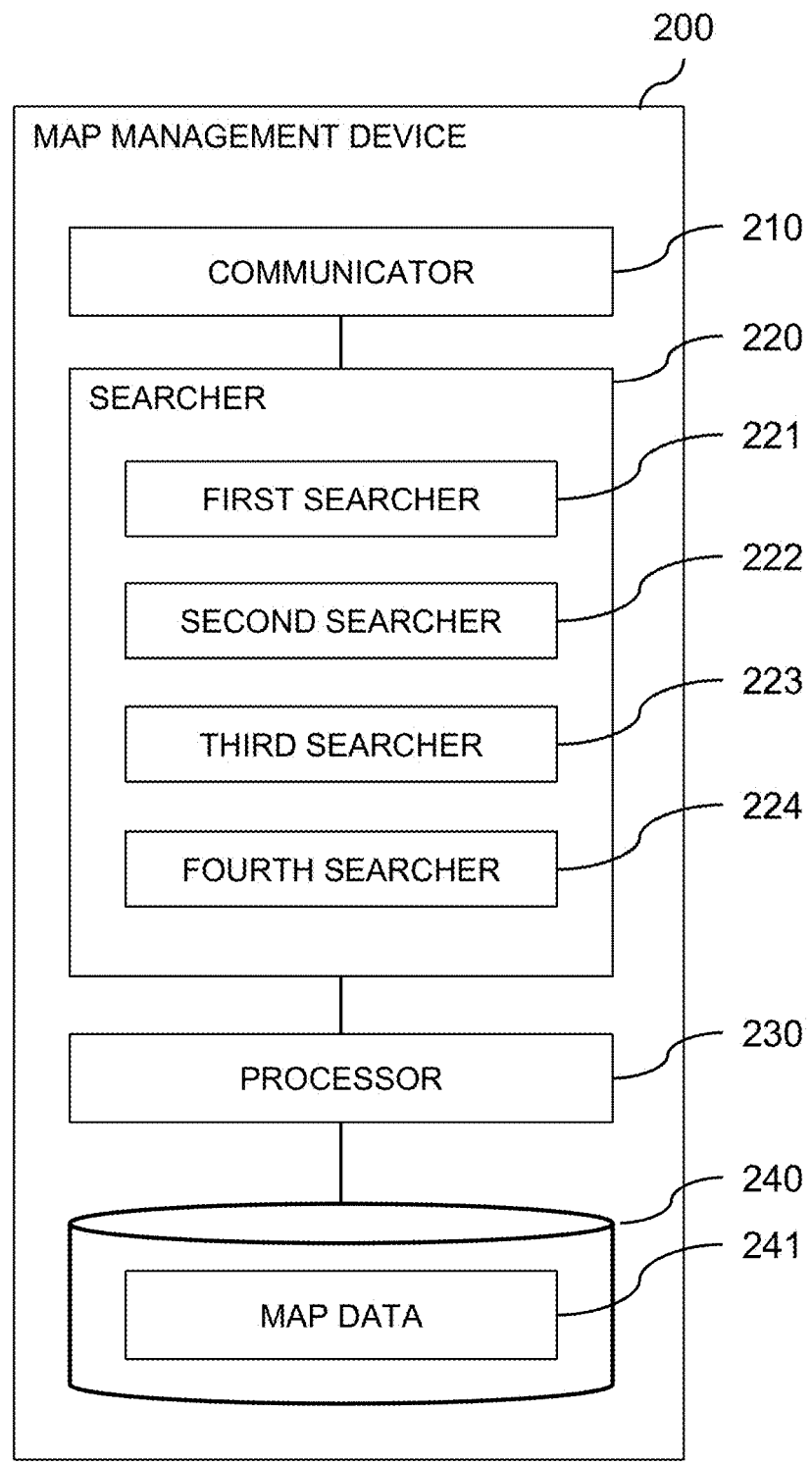
FIG. 3 is a configuration diagram of a map management device 200.

FIG. 3 is a configuration diagram of the map management device 200. The map management device 200 includes a communicator 210, a searcher 220, a processor 230, and a storage unit 240. The searcher 220 further includes a first searcher 221, a second searcher 222, a third searcher 223, and a fourth searcher 224. The storage unit 240 is a storage device that stores the map data 241 provided by the map management device 200.

The communicator 210 communicates with the map server 300 via the communication unit 11 and receives update data describing an update target. The searcher 220 determines from which area on the map data 241 the update data describing the road information of the update target portion is to be obtained from the map server 300. This process can also be referred to as a process of searching for a portion to be updated in the area on the map data 241. Specific search processing is performed by the first searcher 221 to the fourth searcher 224. Operations of the first searcher 221 to the fourth searcher 224 will be described later. The processor 230 reflects the obtained update data on the map data 241.

The searcher 220 and the processor 230 can be configured by using hardware such as a circuit device that implements these functions, or by an arithmetical unit such as a central processing unit (CPU) executing software that implements these functions.

Figure 4:
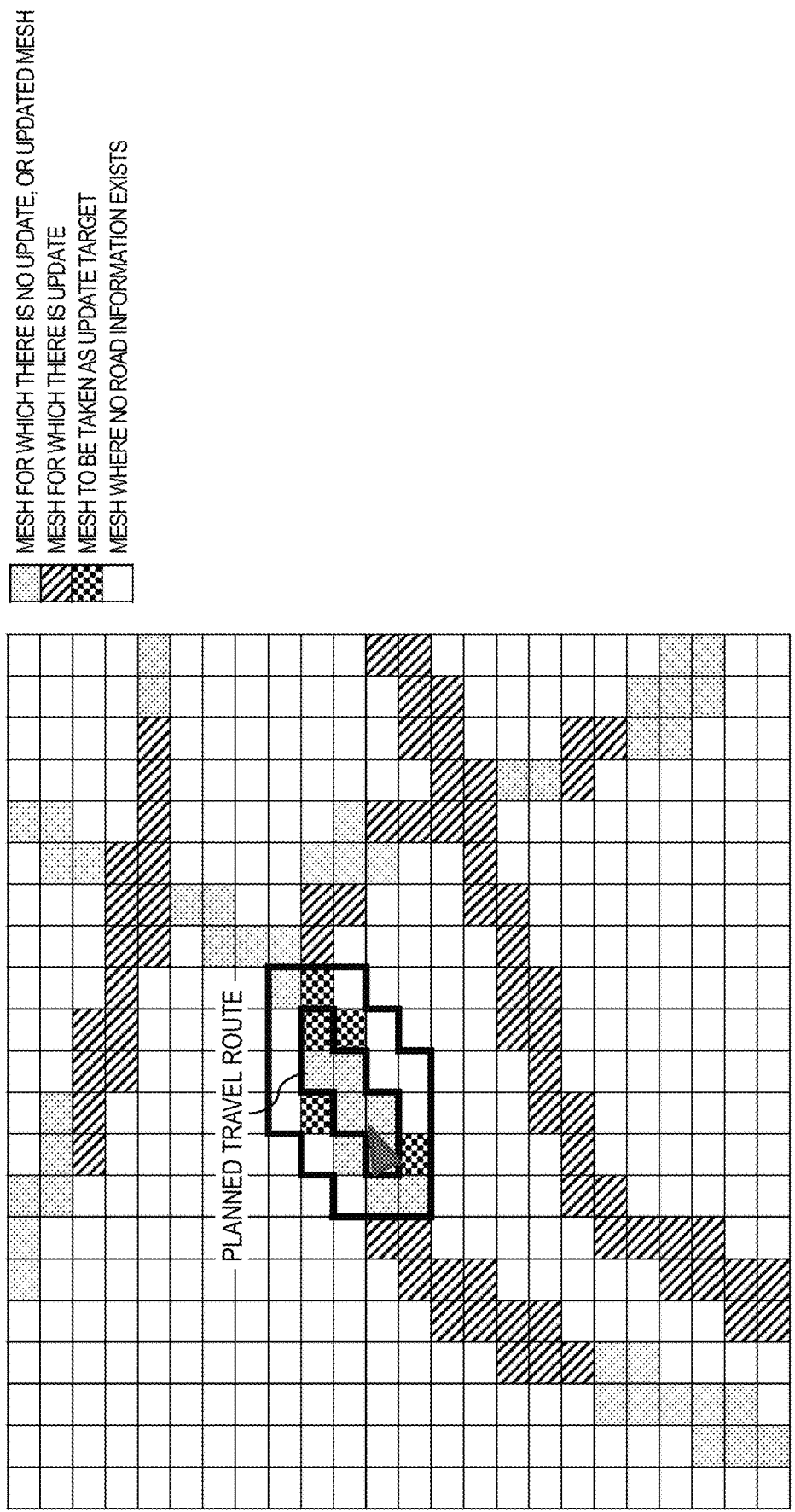
FIG. 4 is a diagram illustrating a procedure in which a first searcher 221 searches for an update target portion.

FIG. 4 is a diagram illustrating a procedure in which the first searcher 221 searches for an update target portion. In the map data 241, for example, an area described by a Cartesian coordinate system is divided into meshes, and information such as coordinates of roads existing in each mesh can be described. The mesh corresponding to the current position of the vehicle 10 can be determined by referring to the coordinates described by the mesh. Further, based on road information estimated from the current position, it can also be determined by referring to which mesh the road information is included.

The meshes on the map data 241 can be classified into the following four types: (a) mesh where road information on the map server 300 matches with road information on the map data 241 and there is no need to be updated (mesh for which there is no update, or updated mesh); (b) mesh where road information on the map server 300 does not match with road information on the map data 241, and the road information on the map data 241 should be updated (mesh for which there is an update) (c) mesh that is actually taken as an update target among (b); and (d) mesh where no road information exists. The searcher 220 searches for an update target portion (mesh corresponding to (c) above) for each mesh, and obtains update data for the update target portion from the map server 300.

In FIG. 4, it is assumed that the vehicle 10 is present on the mesh with a triangle mark. The first searcher 221 obtains the planned travel route of the vehicle 10 from the car navigation system 13. The first searcher 221 inquires of the map server 300 whether or not a non-updated mesh (mesh whose road information has been updated on the map server 300 but has not been updated on the map management device 200) is included in the meshes of the planned travel route. If the non-updated mesh is included, that mesh is determined as the update target portion.

The first searcher 221 further searches for whether or not the non-updated mesh is included in meshes adjacent to the planned travel route. If included, the mesh is determined as the update target portion. In the example illustrated in FIG. 4, the first searcher 221 has found five meshes indicated by a spotted pattern in FIG. 4 as the update target portions by the above procedure.

Figure 5:
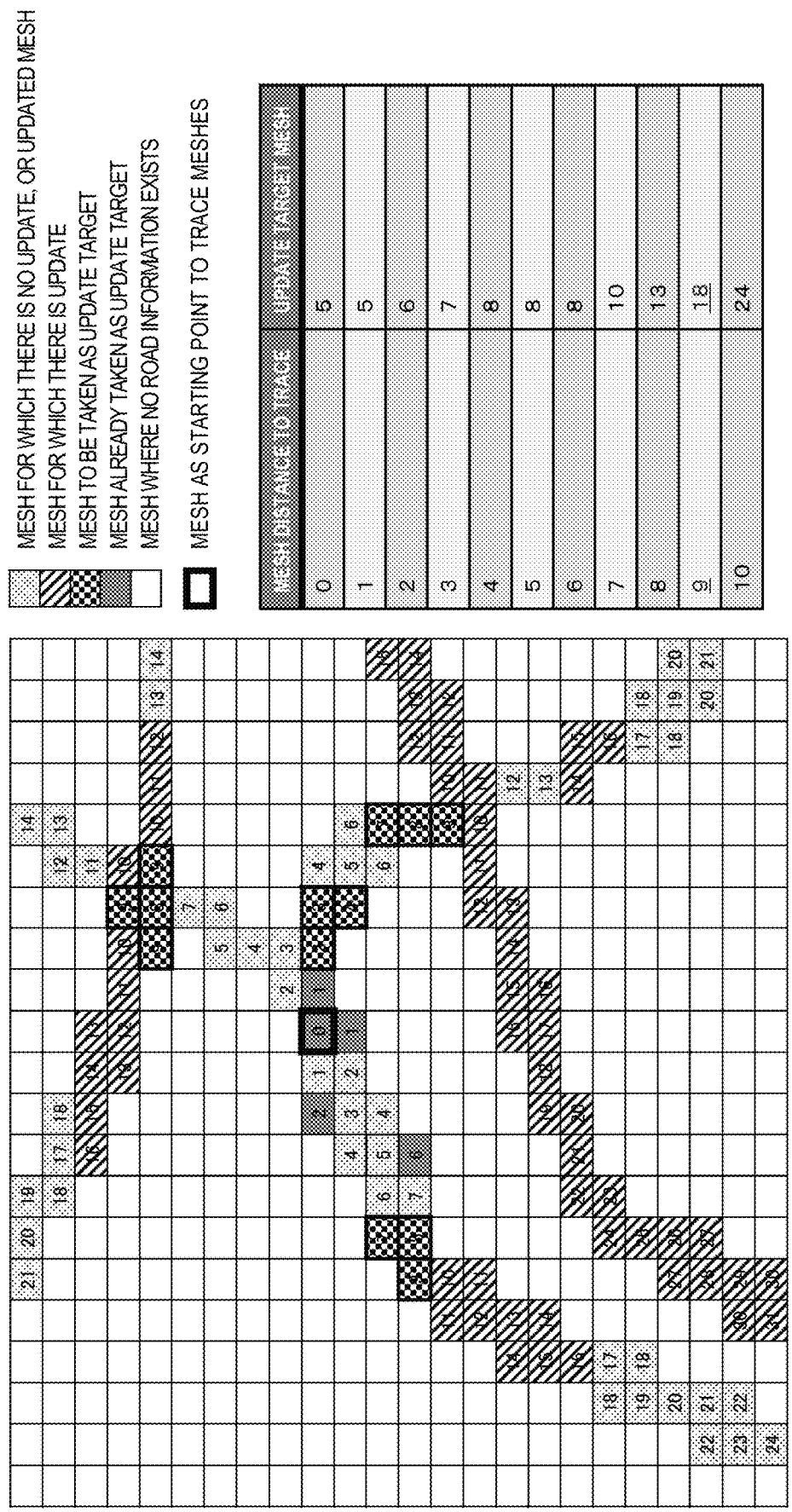
FIG. 5 is a diagram illustrating a procedure in which a second searcher 222 searches for the update target portion.

FIG. 5 is a diagram illustrating a procedure in which the second searcher 222 searches for the update target portion. The road information of the surroundings of the vehicle 10 is updated to the latest version by the first searcher 221 searching the planned travel route (and its adjacent meshes). However, if only a surrounding area of the vehicle 10 is updated, the road information at a distant area is left non-updated, and there is a possibility that the communication load or the like becomes excessive when updating the information at once. Accordingly, the second searcher 222 expands the area to be searched for the update target portion further from the planned travel route. Specifically, the second searcher 222 searches for the non-updated mesh by sequentially tracing meshes where road information exists, from the mesh at an end of the planned travel route as a starting point of the search.

In the process of the second searcher 222 searching for the non-updated mesh, meshes to be updated are gradually accumulated. Since the communication load and the processing load become excessive when the number of update target meshes becomes too large, the second searcher 222 completes the search when the number of update target meshes reaches an upper limit number (20 meshes in FIG. 5). In FIG. 5, the update target meshes exceed the upper limit number at the time when 10 meshes are traced starting from the starting point mesh. Therefore, the second searcher 222 determines, as the update target portion, the non-updated mesh or meshes found until tracing nine meshes since starting from the starting point mesh.

When the number of update target meshes found by the first searcher 221 exceeds the upper limit number, the search by the second searcher 222 may be omitted. In this case, among update target meshes found by the first searcher 221, for example, the first 20 meshes found can be determined as the update target portion.

Figure 6:
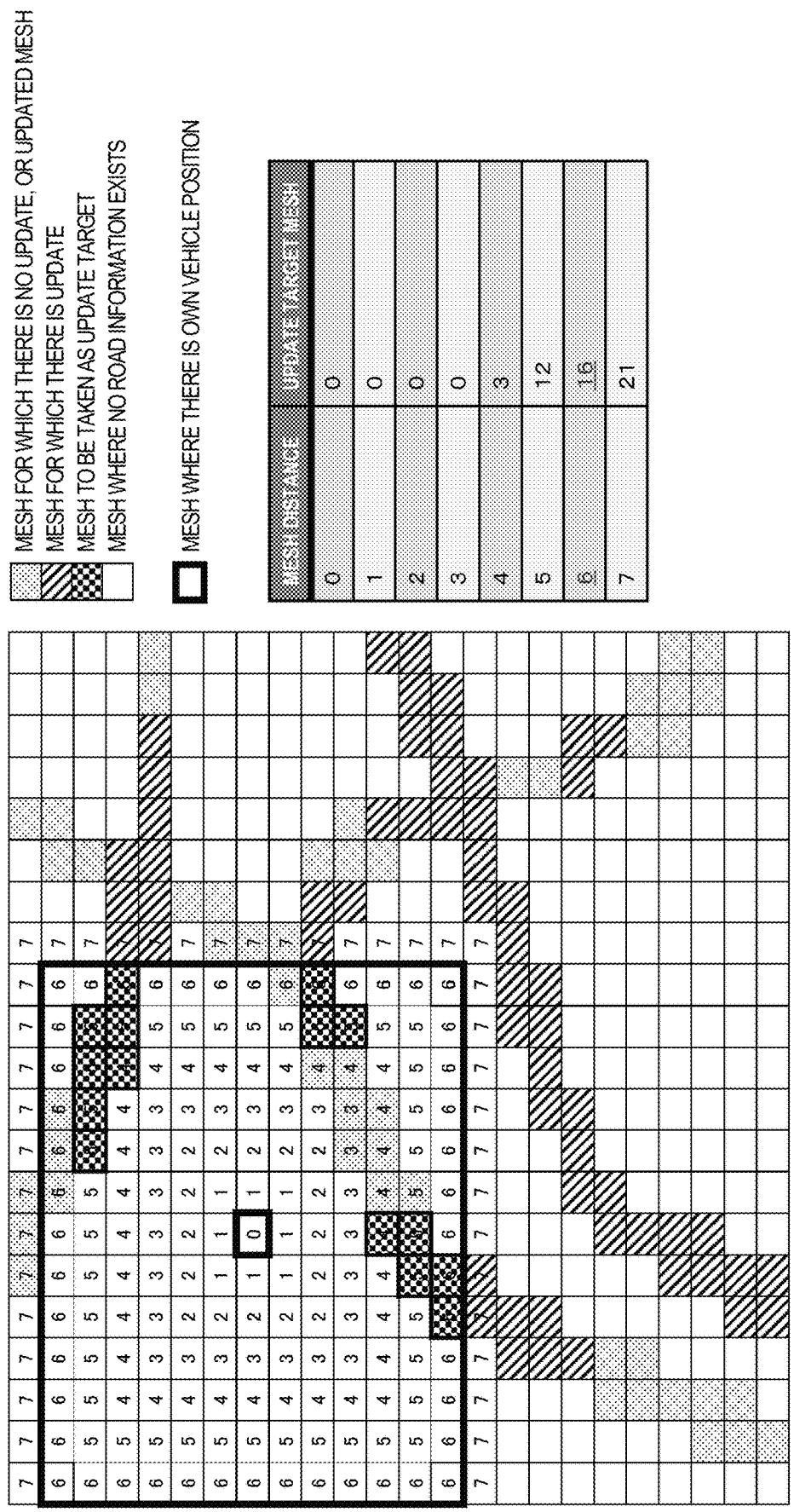
FIG. 6 is a diagram illustrating a procedure in which a third searcher 223 searches for the update target portion.

FIG. 6 is a diagram illustrating a procedure in which the third searcher 223 searches for the update target portion. Since the first searcher 221 and the second searcher 222 search for the update target portion on the basis of the planned travel route, if the planned travel route cannot be obtained for some reason, it is necessary to search for the update target portion by another method. The third searcher 223 searches for the update target portion in such a situation.

Specifically, adjacent meshes are sequentially searched from the mesh where the vehicle 10 is present as the starting point, and when the update target meshes exceed the upper limit number (the same number as described in FIG. 5), the update target meshes found up to immediately previously are determined as the update target portion. In FIG. 6, the update target meshes exceed the upper limit number at the time when having searched meshes within the range in which the distance to the search target mesh is seven meshes since starting from the starting point mesh. Therefore, the third searcher 223 determines the non-updated mesh or meshes found by searching meshes within the range of six meshes starting from the starting point mesh as the update target portion.

Besides the case where the planned travel route cannot be obtained, the first searcher 221 and the second searcher 222 cannot search for the update target portion also in a case where no road information extending from the current position of the vehicle 10 exists. Therefore, the third searcher 223 may search for the update target portion also in such a case. The own vehicle position in FIG. 6 is an example of such a situation.

Figure 7:
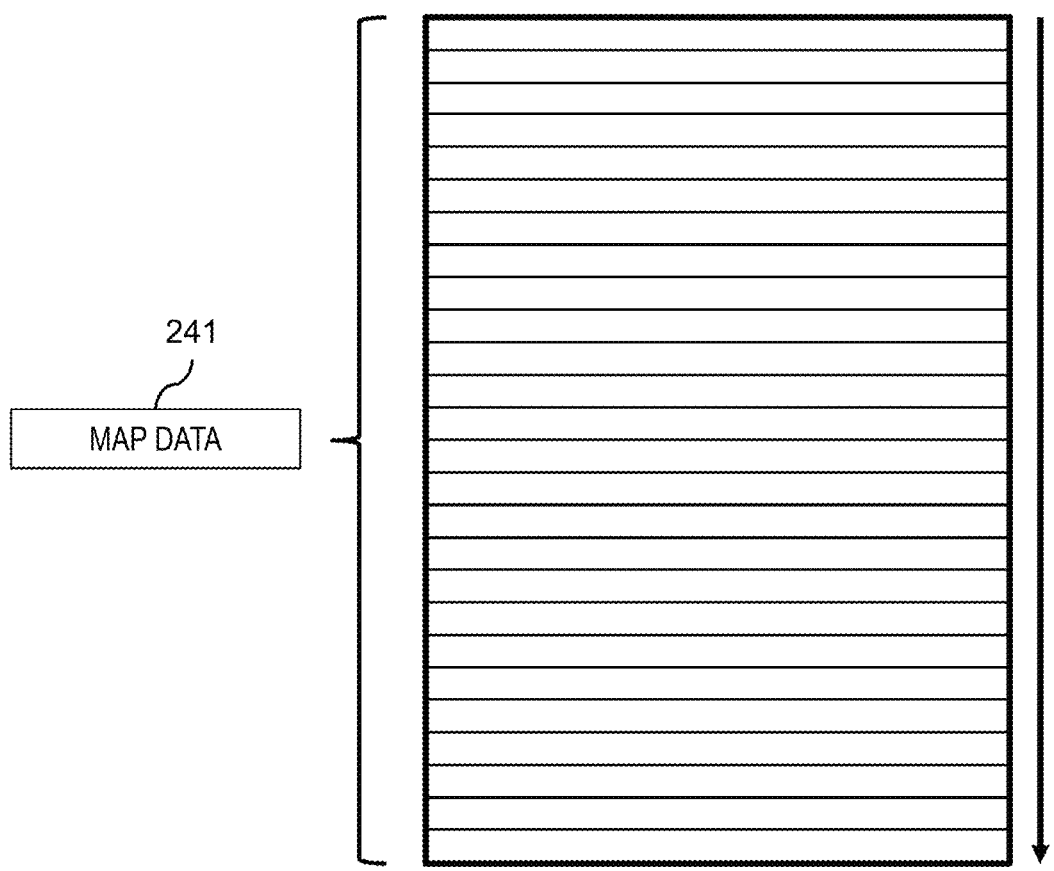
FIG. 7 is a diagram illustrating a procedure in which a fourth searcher 224 searches for the update target portion.

FIG. 7 is a diagram describing a procedure in which the fourth searcher 224 searches for the update target portion. The search by the first searcher 221 to the third searcher 223 tends to increase the processing load as the distance from a search starting position increases. Therefore, when the distance from the search starting position to the search target mesh by each of the first searcher 221 to the third searcher 223 exceeds a predetermined threshold, the update target portion found by that time by the first searcher 221 to the third searcher 223 is employed, and thereafter the fourth searcher 224 performs the search.

Specifically, the fourth searcher 224 searches for the update target portion by sequentially referring to records held by the map data 241 in order from the beginning, regardless of the position of the vehicle 10 and the mesh structure. Regarding the records held by the map data 241, for example, each record may be configured as one mesh in some cases. In other cases, larger or smaller scope may be configured as one record. In either case, since the map data 241 is searched in order from the beginning, the update target portion can be determined by a simple process.

Figure 8:
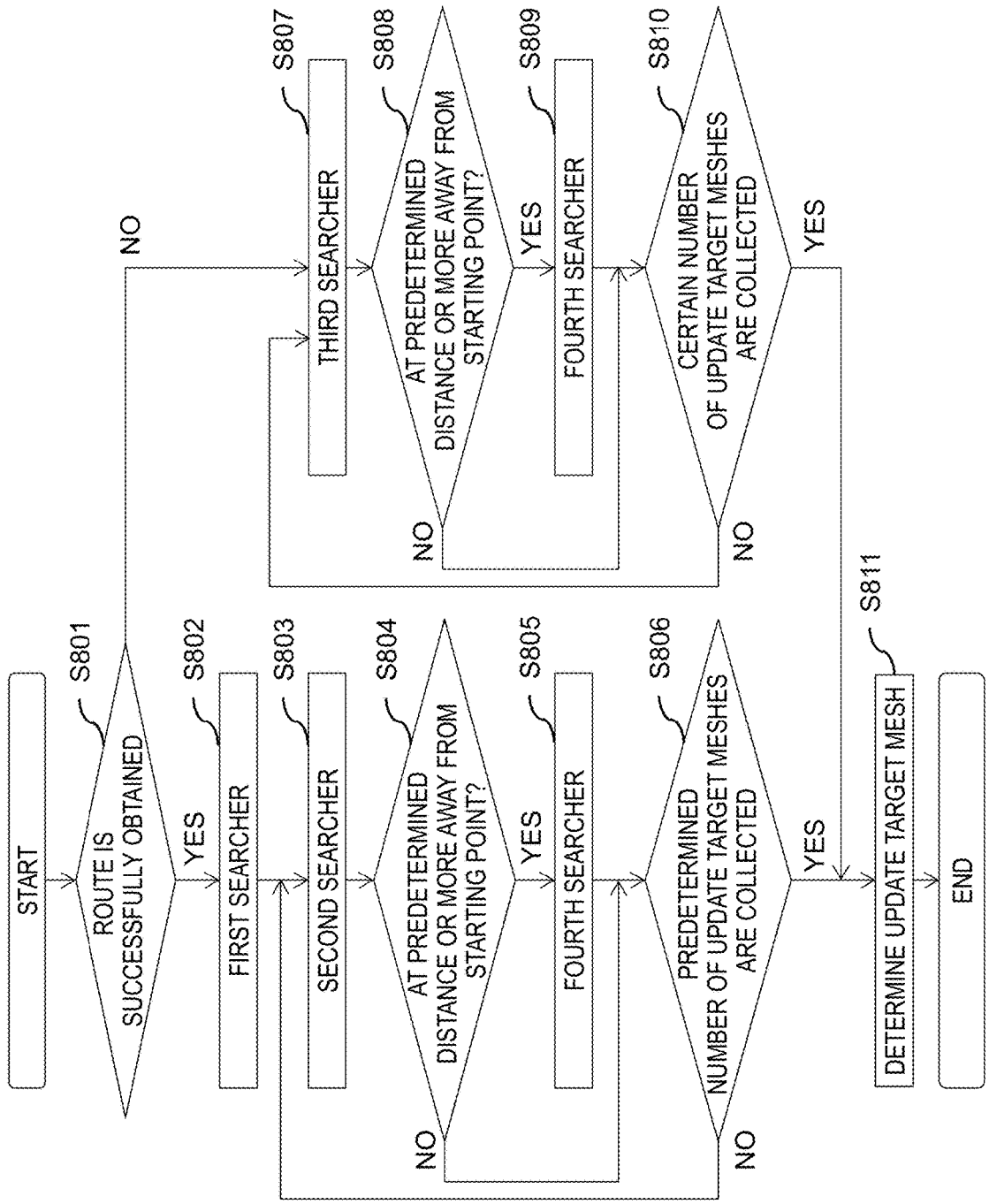
FIG. 8 is a flowchart describing a procedure in which a searcher 220 searches for an update target portion of a map data 241.

FIG. 8 is a flowchart describing a procedure in which the searcher 220 searches for the update target portion of the map data 241. The searcher 220 repeatedly executes this flowchart, for example, every predetermined cycle while power is supplied to the map management device 200. Hereinafter, each step of FIG. 8 will be described.

(FIG. 8: Step S801)

The searcher 220 obtains the planned travel route of the vehicle 10 from the car navigation system 13. If the planned travel route is successfully obtained, the process proceeds to step S802. If not, the process proceeds to step S807. In addition, also when the road information extending from the current position of the vehicle 10 is not successfully obtained from the map data 241, the process proceeds to step S807. This step is for determining whether to perform the search by the first searcher 221 and the second searcher 222 or the search by the third searcher 223.

(FIG. 8: Steps S802 and S803)

Each of the first searcher 221 (S802) and the second searcher 222 (S803) searches for the update target portion according to the procedure described in FIGS. 4 and 5.

(FIG. 8: Steps S804 and S805)

The searcher 220 determines whether or not the distance from the starting point (current position of the vehicle 10) of the search to a search target location has reached a predetermined threshold value or more (S804). If the distance has reached the predetermined threshold value or more, the process proceeds to step S805, and the fourth searcher 224 searches for the update target portion according to the procedure described in FIG. 7. If the distance has not reach the predetermined threshold value, the process skips to step S806.

(FIG. 8: Step S806)

The searcher 220 determines whether or not a predetermined number of update target meshes (20 meshes in the examples so far) has been collected through the above steps. If the predetermined number has been collected, the process proceeds to step S811. If not, the process returns to step S803 to repeat the same process.

(FIG. 8: Step S807)

The third searcher 223 searches for the update target portion according to the procedure described in FIG. 6.

(FIG. 8: Steps S808 and S809)

The searcher 220 determines whether or not the distance from the starting point (current position of the vehicle 10) of the search to the search target location has reached a predetermined threshold value or more (S808). If the distance has reached the predetermined threshold value or more, the process proceeds to step S809, and the fourth searcher 224 searches for the update target portion according to the procedure described in FIG. 7. If the distance has not reach the predetermined threshold, the process skips to step S810.

(FIG. 8: Step S810)

The searcher 220 determines whether or not a predetermined number of update target meshes (20 meshes in the examples so far) has been collected through the above steps. If the predetermined number has been collected, the process proceeds to step S811. If not, the process returns to step S807 to repeat the same processing.

(FIG. 8: Steps S806 and S810: Supplementary Note)

In the above description, S806 is performed after S805. However, after each of the first searcher 221 to the third searcher 223 has performed the search, it may be determined whether or not a predetermined number of update target meshes has been collected. If the predetermined number has not been collected, each step is performed as illustrated in FIG. 8, or if it has been collected, it is possible to skip to step S811 at that time. The same applies to S810.

(FIG. 8: Step S811)

The searcher 220 determines the update target meshes collected by the searches in the above steps as the update target portion. The communicator 210 obtains update data corresponding to the update target portion from the map server 300. The processor 230 reflects the received update data on the map data 241.

The searcher 220 searches the update target meshes according to the above steps. However, instead of inquiring of the map server 300 at the time of the search by each searcher, the update target meshes may be searched for by each of the above-described searchers based on the position of the vehicle 10 after obtaining information indicating presence or absence of updates regarding all meshes held by the map server 300 at once when the map providing device 100 is started (or at a frequency such as once a day).

Embodiment 1: Summary

The map management device 200 according to the first embodiment searches for the update target portion from a planned travel route and adjacent meshes thereof, and also searches for the update target portion by tracing the road from an end point of the planned travel route as a starting point of the search. Thus, it is possible to preferentially search for the update target portion from the surrounding area of the vehicle 10 and efficiently search for the update target portion existing in a more distant area.

The map management device 200 according to the first embodiment searches for the update target portion from an area within a predetermined range centered on the current position of the vehicle 10 when the planned travel route has not been successfully obtained, or when road information extending from the current position of the vehicle 10 has not been successfully obtained. Thus, it is possible to reliably search for the update target portion regardless of the position of the vehicle 10.

When the distance from a search starting point to a search location has reached a predetermined distance or more, the map management device 200 according to the present first embodiment employs the update target portion found by that time and searches for the update target portion by referring to records of the map data 241 in order from the beginning. This makes it possible to suppress an excessive calculation load.

Second Embodiment

Figure 9:
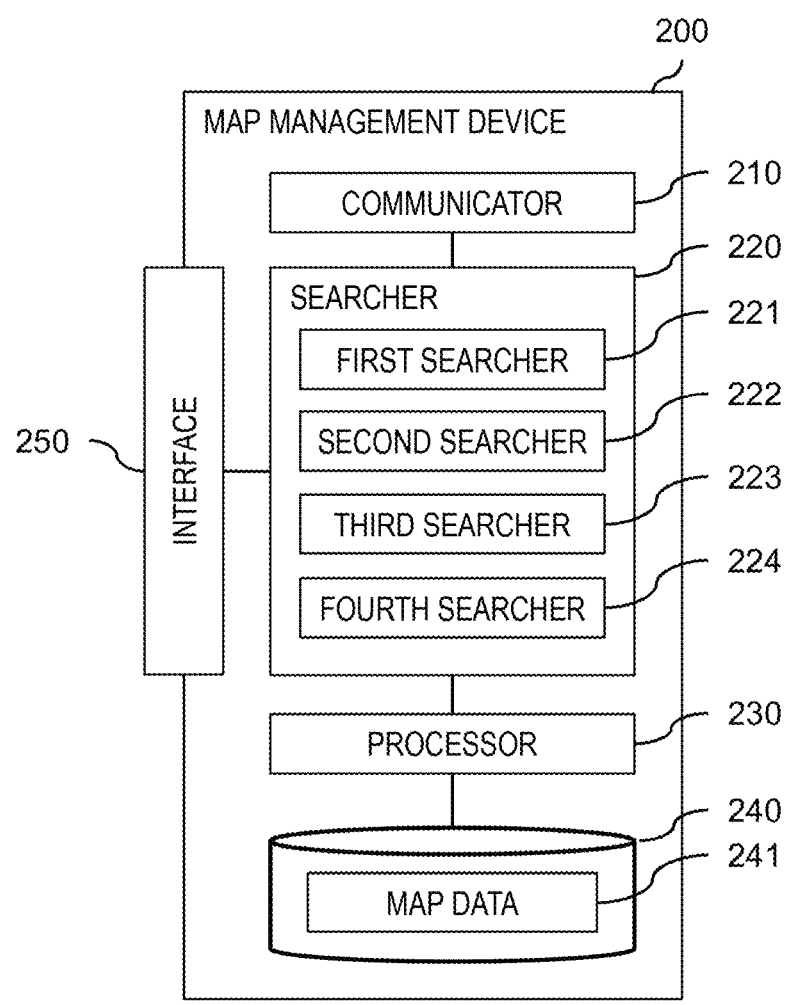
FIG. 9 is a configuration diagram of the map management device 200 according to a second embodiment.

FIG. 9 is a configuration diagram of a map management device 200 according to a second embodiment of the present invention. In the second embodiment, the map management device 200 includes an interface 250 in addition to the configuration described in the first embodiment. The interface 250 is, for example, for the driver of the vehicle 10 to give the map providing device an instruction input that specifies an area to be searched for the update target portion. The searcher 220 searches for the update target portion from the mesh corresponding to the area specified by the instruction input. As for the search priority, for example, the area specified by the instruction input may be searched with the highest priority, or the specified area may be searched after at least one of the first searcher 221 to the fourth searcher 224 has performed the search. Other suitable priorities may be given.

<Regarding Modification Examples of the Present Invention>

Note that the present invention is not limited to the above-described embodiments and includes various modification examples. For example, the above-described embodiments are described in detail to explain the present invention in an easy-to-understand manner, and is not necessarily limited to one having all the described configurations. Further, part of the configuration of one embodiment can be replaced with a configuration of another embodiment, and a configuration of another embodiment can be added to the configuration of one embodiment. Moreover, it is possible to add, delete, and replace other configurations for part of the configurations of the respective embodiments.

The above-mentioned respective configurations, functions, processors, processing means, and so on may be implemented by hardware by, for example, designing a part or all of them in an integrated circuit, or the like. Further, each of the above configurations, functions, and the like may be implemented by software by a processor interpreting and executing a program that implements each function. Information such as a program, a table, and a file for implementing each function can be stored in a memory, a recording device such as a hard disk or a solid state drive (SSD), or a recording medium such as an IC card or an SD card. Further, control lines and information lines illustrated indicate those which are considered necessary for the purpose of description, and do not necessarily indicate all the control lines and information lines necessary for the product. In practice, it may be considered that almost all components are interconnected.

REFERENCE SIGNS LIST 100 map providing device
110 calculator
111 absolute position estimator
112 relative position estimator
113 matching unit
114 position corrector
120 GNSS tuner
130 acceleration sensor
200 map management device
210 communicator
220 searcher
221 first searcher
222 second searcher
223 third searcher
224 fourth searcher
230 processor
240 storage unit
241 map data
250 interface

The invention claimed is:

1. A map providing device that provides map data describing a map of roads on which a vehicle travels, the map providing device comprising:
a storage unit that stores the map data;
a communicator that receives update data describing road information of an update target portion that is an update target in the map data stored in the storage unit;

a searcher that searches for the update target portion included in the map data; and a processor that reflects, on the map data, the update data corresponding to the update target portion obtained through the search by the searcher, wherein the searcher further includes:

a first searcher that searches for the update target portion included in a planned travel route on which the vehicle is scheduled to travel; and a second searcher that searches for the update target portion from an end point of the planned travel route as a starting point of search;

wherein the second searcher searches for the update target portion if an amount of the update target portion found by the first searcher does not reach a predetermined amount.

2. The map providing device according to claim 1, wherein the map data is described by coordinates divided into meshes, and the second searcher searches for the update target portion by tracing portions of the meshes where a road is described, from an end point of the planned travel route as a starting point of search.

3. The map providing device according to claim 1, wherein the map data is described by coordinates divided into meshes, and the first searcher searches for the update target portion existing in meshes including the planned travel route, and also searches for the update target portion existing in meshes adjacent to meshes including the planned travel route.

4. The map providing device according to claim 1, wherein the searcher further includes a third searcher that searches for the update target portion existing within a predetermined range centered on a current position of the vehicle when the planned travel route has not been successfully obtained.

5. The map providing device according to claim 1, wherein the searcher further includes a third searcher that searches for the update target portion existing within a predetermined range centered on a current position of the vehicle when no road extending from the current position of the vehicle is described on the map data.

6. The map providing device according to claim 1, wherein the searcher further includes a fourth searcher that searches for the update target portion in order of records described in the map data when a distance from a starting point of searching for the update target portion to a search location has reached a predetermined distance or more.

7. The map providing device according to claim 1, wherein the map data is described by coordinates divided into meshes, and the searcher further includes a fourth searcher that searches for the update target portion in order of records described in the map data when a number of meshes to be passed from the starting point of searching for the update target portion to a search location has reached a predetermined number or more.

8. The map providing device according to claim 1, wherein the searcher terminates the search when the update target portion obtained by the search reaches a predetermined amount, and the processor reflects on the map data the update target portion obtained by the searcher until the search is terminated.

9. The map providing device according to claim 1, wherein the searcher obtains the planned travel route from a car navigation system mounted in the vehicle.

10. The map providing device according to claim 1, wherein the map providing device further includes an interface that receives an instruction input that specifies a range to search for the update target portion, the searcher searches for the update target portion existing in a range specified by the instruction input.

11. The map providing device according to claim 1, wherein the searcher repeatedly performs the search while power is supplied to the map providing device.

* * * * *